Sept. 13, 1932.   A. L. HESTON ET AL   1,877,746
COLLAPSIBLE DRUM
Filed Feb. 5, 1931   4 Sheets-Sheet. 1

INVENTORS
ALLEN L. HESTON
FLORAIN J. SHOOK
EARL W. EVANS

BY
ATTORNEYS

Sept. 13, 1932.  A. L. HESTON ET AL  1,877,746
COLLAPSIBLE DRUM
Filed Feb. 5, 1931  4 Sheets-Sheet 2

INVENTORS
ALLEN L. HESTON
FLORAIN J. SHOOK
EARL W. EVANS
BY Ely & Barrow
ATTORNEYS Sept. 13, 1932.  A. L. HESTON ET AL  1,877,746

COLLAPSIBLE DRUM

Filed Feb. 5, 1931  4 Sheets-Sheet 3

INVENTORS
ALLEN L. HESTON
FLORAIN J. SHOOK
EARL W. EVANS

BY Ely & Barrow

ATTORNEYS

Sept. 13, 1932.   A. L. HESTON ET AL   1,877,746
COLLAPSIBLE DRUM
Filed Feb. 5, 1931   4 Sheets-Sheet 4
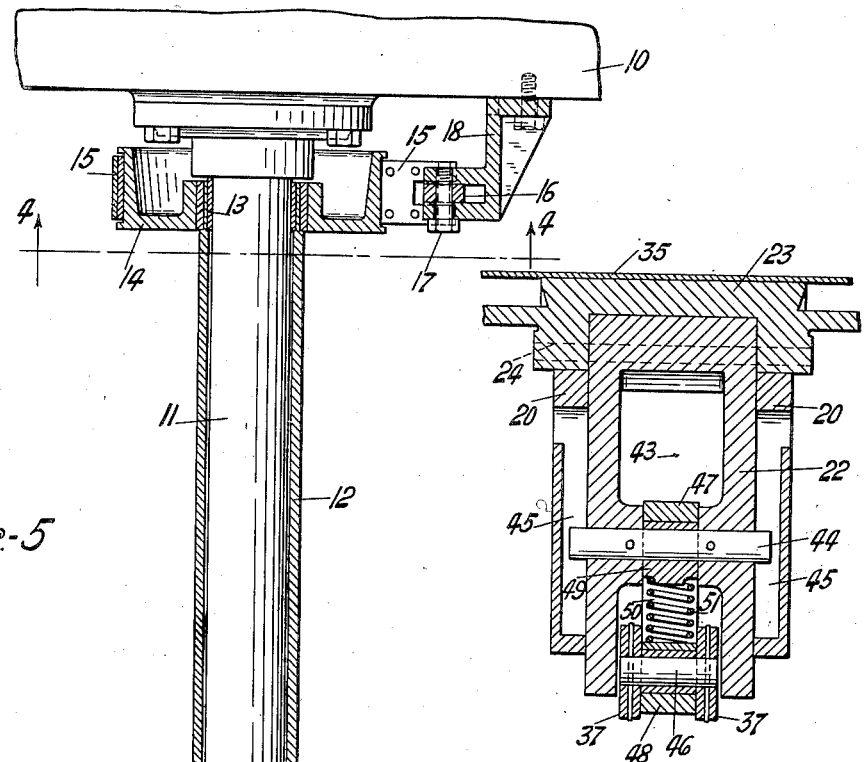
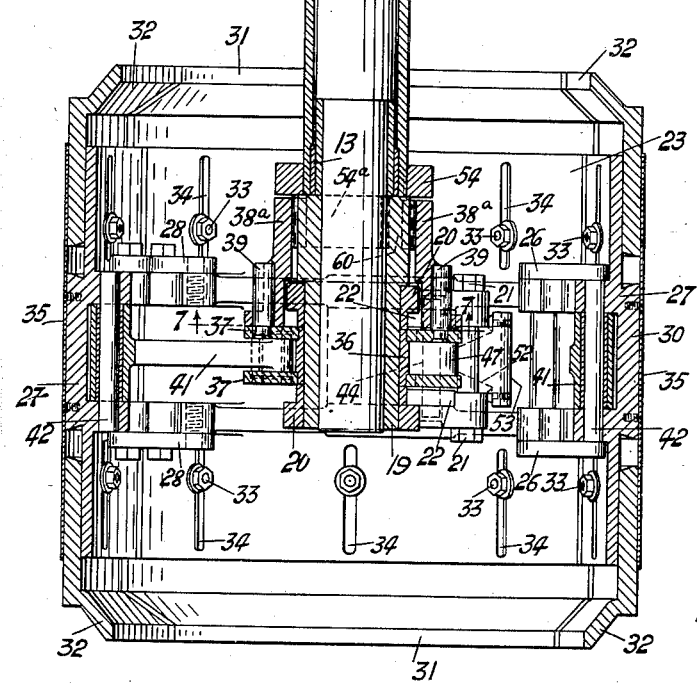
INVENTORS
ALLEN L. HESTON
FLORAIN J. SHOOK
EARL W. EVANS
BY
ATTORNEYS

UNITED STATES PATENT OFFICE

ALLEN L. HESTON AND FLORAIN J. SHOOK, OF AKRON, AND EARL W. EVANS, OF COLUMBIANA, OHIO, ASSIGNORS TO THE NATIONAL RUBBER MACHINERY COMPANY, OF AKRON, OHIO, A CORPORATION OF OHIO

COLLAPSIBLE DRUM

Application filed February 5, 1931. Serial No. 513,592.

This invention relates to collapsible drums, and more especially to collapsible tire building drums such as are used in the manufacture of pulley band or drum built tires.

The chief objects of the invention are to provide a tire building drum of maximum collapsing capacity; to facilitate the removal of tires from the drum; to provide for collapsing every section of the drum; to provide a collapsible drum that will be in balanced condition while collapsed; to provide against collapse of the drum due to pressure of tire-building tools thereagainst; and to provide a collapsible drum which may be collapsed and assembled by the power which rotates it on its axis. In general, the invention aims to save time and labor in the manufacture of pneumatic tire casings.

Of the accompanying drawings,

Figure 5 is a section of the drum and its supporting spindle taken on line 5—5 of Figure 1;

Figure 6 is a sectional detail on line 6—6 of Figure 3; and

Figure 4:
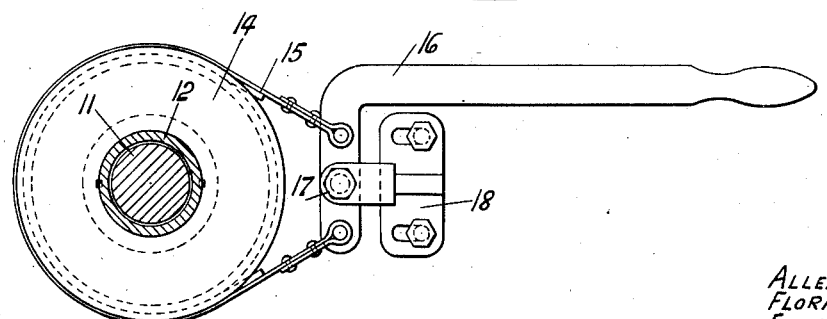
Figure 4 is an elevation of a differential brake associated with the drum spindle, as it is viewed from line 4—4 of Figure 5.

Referring to Figure 5 of the drawings, 10 is the housing or frame of a tire building machine of known design, and 11 is a horizontal power driven spindle projecting therefrom and carrying on its outer end a collapsible tire building drum. The tire building drum is collapsed by relative movement of particular parts thereof, and such relative movement is produced by means of a sleeve or quill 12 which is journaled upon bushings 13, 13 on the spindle 11, and provided with a manually operated differential brake by which rotative movement of the sleeve may be retarded with relation to the rotation of the spindle 11 to effect the relative movement mentioned. The differential brake, best shown in Figure 4, comprises a brake drum 14 secured upon the sleeve 12 adjacent the housing 10, a brake band 15 trained about the brake drum and having its respective ends secured to a hand lever 16 at equidistant points on opposite sides of the fulcrum or pivotal point 17 of the latter, and a bracket 18 mounted upon the wall of the housing 10 and supporting the lever 16.

Secured upon the outer end portion of the spindle 11 is a bushing 19 and secured to the bushing is a pair of spaced apart brackets 20 joined to each other by bolts 21, 21$^a$. Between them the brackets 20 define two slideways which are on opposite sides of the spindle 11, and mounted in the respective slideways are slides 22, 22 extending in opposite directions from the spindle, and carrying on their outer ends respective arcuate drum sections 23, 23 secured thereto by pins 24, 24. Pivotally mounted at 25 on one end of each drum section 23 is a hinge plate 26 which is secured to a drum section 27, the pair of drum sections 27 spanning the gaps between drum sections 23 to form the annular drum structure. The free end of each drum section 27 is beveled as shown to fit the complementally beveled end of the adjacent drum section 23. Mounted upon the inner face of the drum sections 27 at the free ends thereof are hook plates 28, 28 which extend across the meeting planes of the sections 23, 27 and engage respective studs 29, 29 projecting from suitable flanges or brackets formed on the inner faces of the adjacent drum sections 23.

The drum sections 23, 27 are of the laterally expansible type, each of them comprising a medial circumferential rib or elevation 30 and respective plates 31, 31, 32, 32 at each side of said rib, the tops of the plates and ribs being flush. The plates 31, 32 are secured to the drum sections by bolts 33 which pass through respective slots 34 formed in the drum sections 23, 27 parallel to the axis thereof. Respective thin metal plates 35 are mounted upon the outer faces of the drum sections, being secured to the respective ribs 30 and extending laterally to the edges of the drum sections 23, 27, the arrangement being such that the plates 31, 32 may be shifted laterally to various positions to increase or diminish the width of the drum, without exposing the gaps between the inner margins of the plates 31, 32 and the medial ribs 30 of the drum sections.

Journaled upon a bushing 36 on the bushing 19 between the brackets 20 are spaced apart wrist plates 37, 37. The wrist plates are interconnected to act as a unit, as will presently be described, and the rear wrist plate has operative connection with the sleeve 12 by means subsequently to be described including a yoke 38 which is connected to the wrist plate by a pair of studs 39, 39 which are carried by the wrist plate and project therefrom to fit within suitable apertures formed in the yoke.

Each wrist plate 37 is formed at diametrically opposite points with outwardly extending arms 37$^a$, 37$^a$, and the arms 37$^a$ of each plate are connected to the arms of the other plate by short rods 40, 40 secured in the end portions of said arms. Links 41, 41 pivotally mounted on the rods 40 between the wrist plates have their other ends pivotally connected at 42, 42 to the respective drum sections 27, 27. The pivot points 42 are substantially midway between the hinge points 25 and the free ends of the sections 27.

As is shown in Figure 6, the slides 22 are transversely recessed as at 43 and each slide has a rod 44 which extends through its structure and recess and projects from its opposite sides into longitudinal slots 45, 45 formed in the respective brackets 20. A pair of short rods 46, 46 connect the respective wrist plates 37 at diametrically opposite points, and compression links 47, 47 connect the rods 46 of the wrist plates to the rods 44 of the slides. Each compression link comprises a link member 48, one end of which is mounted upon the rod 46, a spring seat 49 which is mounted upon the rod 44 and which rides in a slot 50 formed in the member 48, and a compression spring 51 interposed between the seat 49 and the end of the slot 50. It will be observed that in the normal expanded condition of the drum, the rods or points 46 are at one side of a line drawn from the axis of rods 44 to the axis of the spindle 11. The compression links 47, 47 constitute lost motion connections which permit the points 46 to move to an equal distance the other side of center before the links become operative in the collapsing of the drum.

Bumpers 52 of rubber or other suitable material are mounted in brackets 53 and suitably positioned, as upon the brackets 20 to receive some of the impact of the moving parts at the terminus of their collapsing movement.

Figure 1:
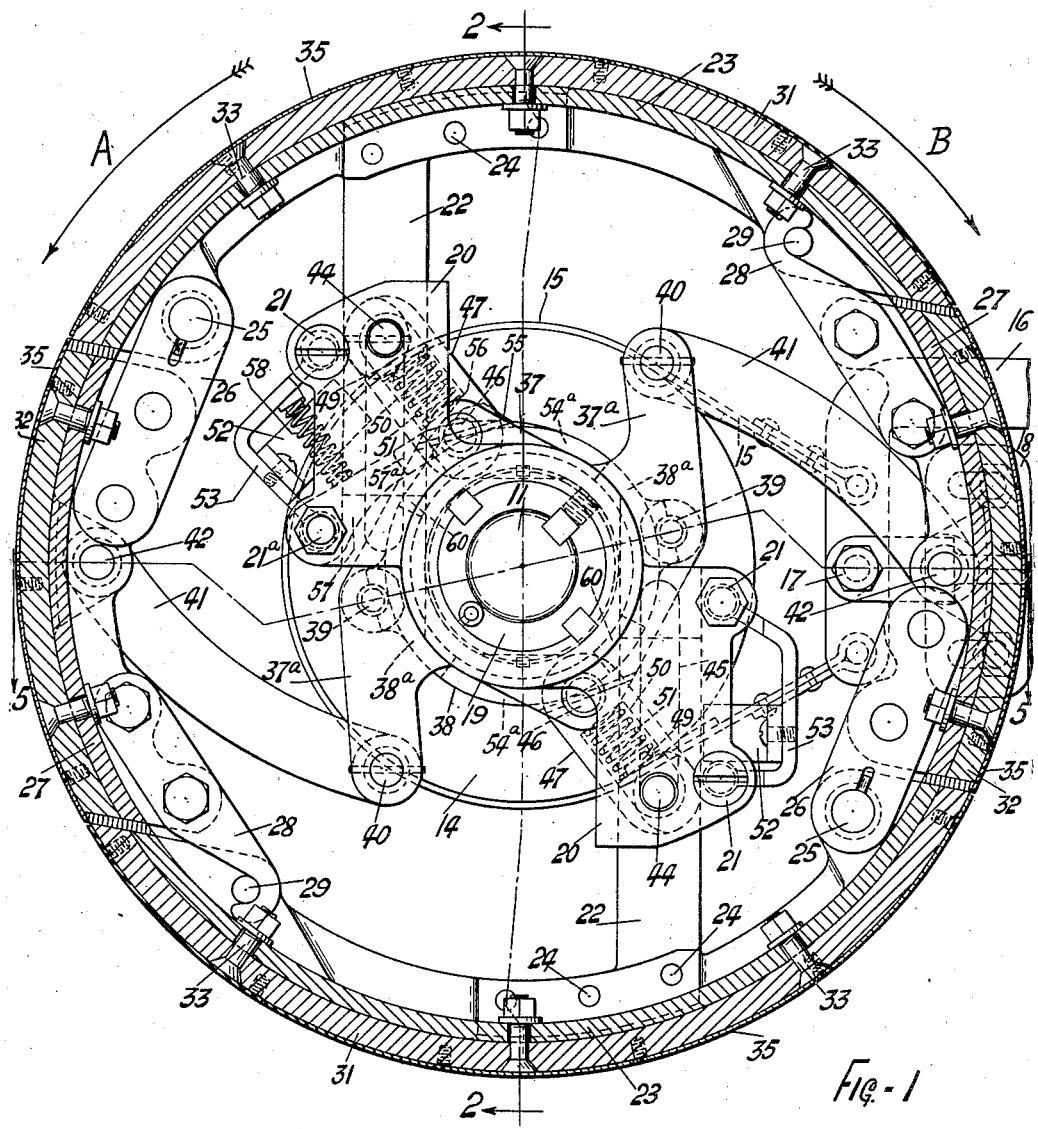
Figure 1 is a transverse section of the collapsible drum in its preferred form in extended or assembled position, taken on line 1—1 of Figure 2.

The yoke 38 is operatively connected to the sleeve 12 by suitable latch mechanism which prevents relative movement of the said sleeve and the spindle 11 when the drum is being driven in the counter-clockwise direction indicated by the arrow A in Figure 1. This is the normal direction of rotation during the building of a tire on the drum, and the arrangement prevents accidental collapse of the drum from excessive pressure of tire-building tools thereagainst. The arrow B, Figure 1, indicates the direction the drum requires to be rotated in order that it may be collapsed.

Figure 7:
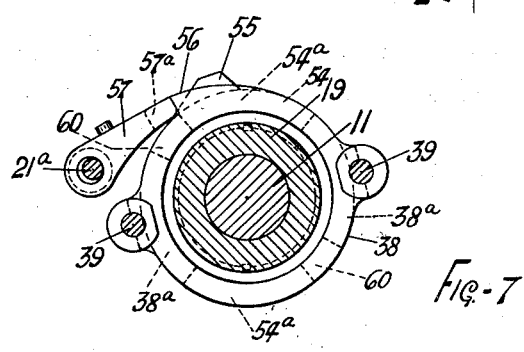
Figure 7 is a detail sectional view on line 7—7 of Figure 5.
Figure 2:
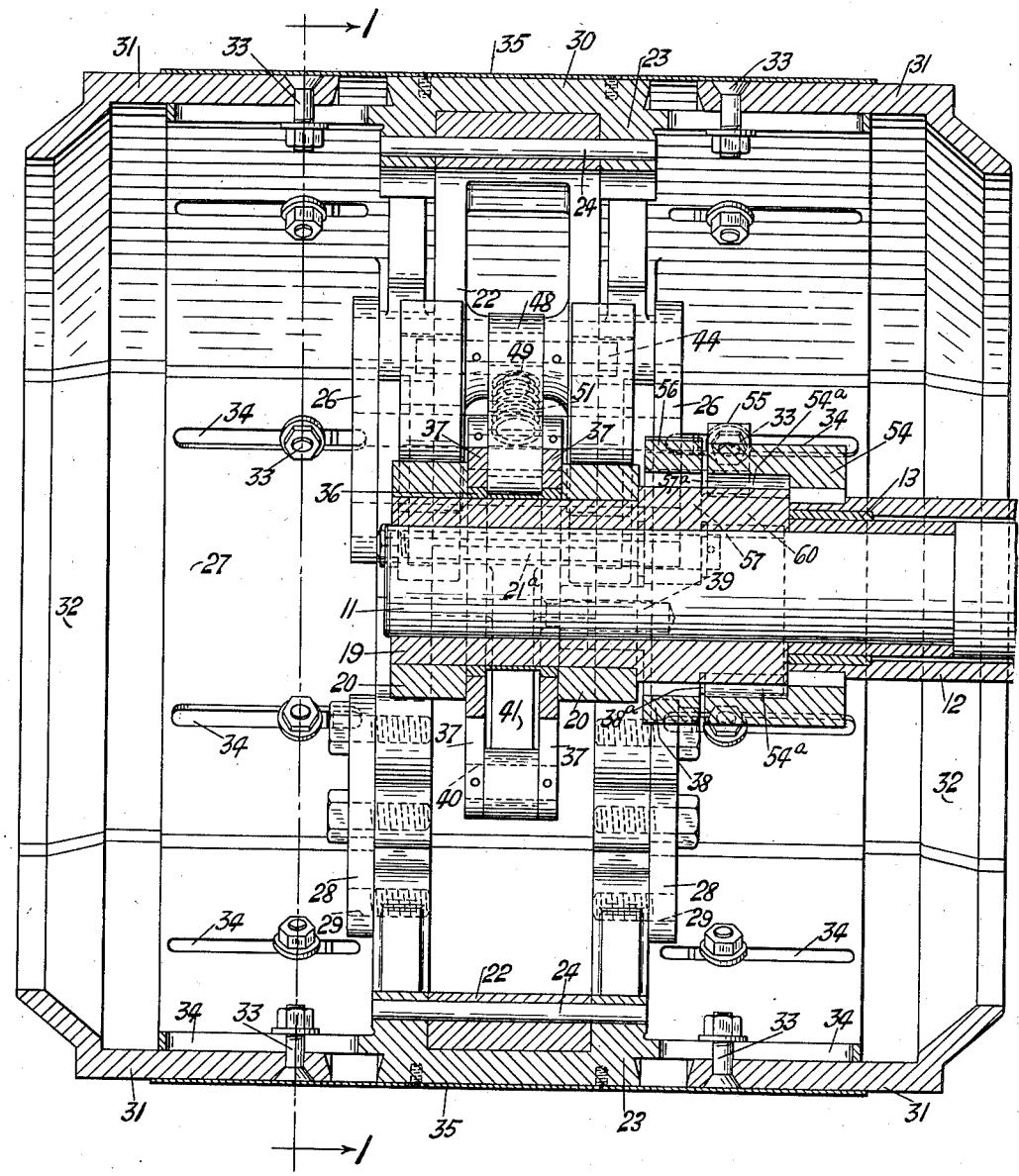
Figure 2 is an axial section of the drum taken on line 2—2 of Figure 1.

Referring to Figure 5 of the drawings, it will be seen that the yoke 38 is formed with a pair of oppositely disposed, rearwardly extending, transversely arcuate fingers or lugs 38$^a$, 38$^a$, and intercolated with said lugs are similar lugs 54$^a$, 54$^a$ (Figure 2) formed on a collar 54 that is keyed to the sleeve 12 rearwardly of the yoke, the width of the lugs 38$^a$, 54$^a$ being such as to provide spaces between the lugs, such as spaces 60, 60, Fig. 7, and thereby to permit limited relative angular movement between the yoke 38 and the collar 54. As is shown in Fig. 7, one of the lugs 54$^a$ of the collar 54 is formed with a cam or trip 55 that projects radially outward therefrom. Formed on the yoke 38 is a single tooth or stop 56 that is engaged by a pawl or dog 57, the latter being pivotally mounted upon the bolt 21$^a$, which, as shown in Figure 7, is eccentrically formed in the region thereof that supports the dog so as to permit adjustment of the latter with relation to the tooth 56. A compression spring 58 is provided for normally urging the dog 57 toward latched position. The free end of the dog 57 is formed with a laterally extending lug 57$^a$ that projects into the orbit of the cam or trip 55 of the collar 54, the arrangement being such that angular movement of the collar, counter-clockwise as viewed in Figure 7, causes the cam 55 to lift the dog 57 out of engagement with the tooth 56.

The normal operative position of the several elements of the drum is shown in Figures 1, 2, 5 and 7, the direction of rotation of the drum being indicated by the arrow A in Figure 1. The drum is usually collapsed at the completion of a tire building operation to remove the finished tire, and the preferred method of collapsing it is to throw the switch to the driving motor so as to reverse the direction of rotation of the drum, and concurrently to bear down on the hand lever 16 to tighten the brake band 15 about the brake drum 14 and thus to retard the rotation of the sleeve 12 with the result that there is relative angular movement between the sleeve 12 and spindle 11. Such relative movement is imparted to the several mechanisms connected respectively to the said sleeve and spindle and may be visualized with reference to Figure 7 as a counter-clockwise rotative movement of the collar 54 while the spindle 11 and yoke 38 are stationary.

This relative movement of the collar 54 first lifts the dog 57 out of engagement with the tooth 56 of the yoke 38 as hereinbefore explained, and then, by closing the spaces 60 between the lugs 38ᵃ, 54ᵃ of the yoke and collar respectively, effects driving engagement between said collar and yoke whereby the latter is moved counter-clockwise and with it the wrist plates 37.

Movement of the wrist plates 37 carries the points 46 over center with relation to lines passing from the center of points 44 to the axis of spindle 11, and because of the compression character of the links 47, no pull is exerted upon either slide 22 until the wrist plates 37 have moved an appreciable distance, this lost motion being ⅝″ by actual measurement in the orbit of the points 46.

By reason of the arms 37ᵃ, the points 40 are a greater distance from the axis of the wrist plates than are the points 46, and consequently the points 40 move a greater linear distance than the points 46 during angular movement of the wrist plates. Movement of the points 40 is communicated through the links 41 to the drum sections 27, and the leverage is such that the movement of the free ends of said drum sections is equal to twice the linear movement of the points 40. The arrangement is such that the free ends of the hinged sections 27 are moved inward about two inches before the points 46 have reached respective positions where they are able to exert pull upon the slides 22.

Figure 3:
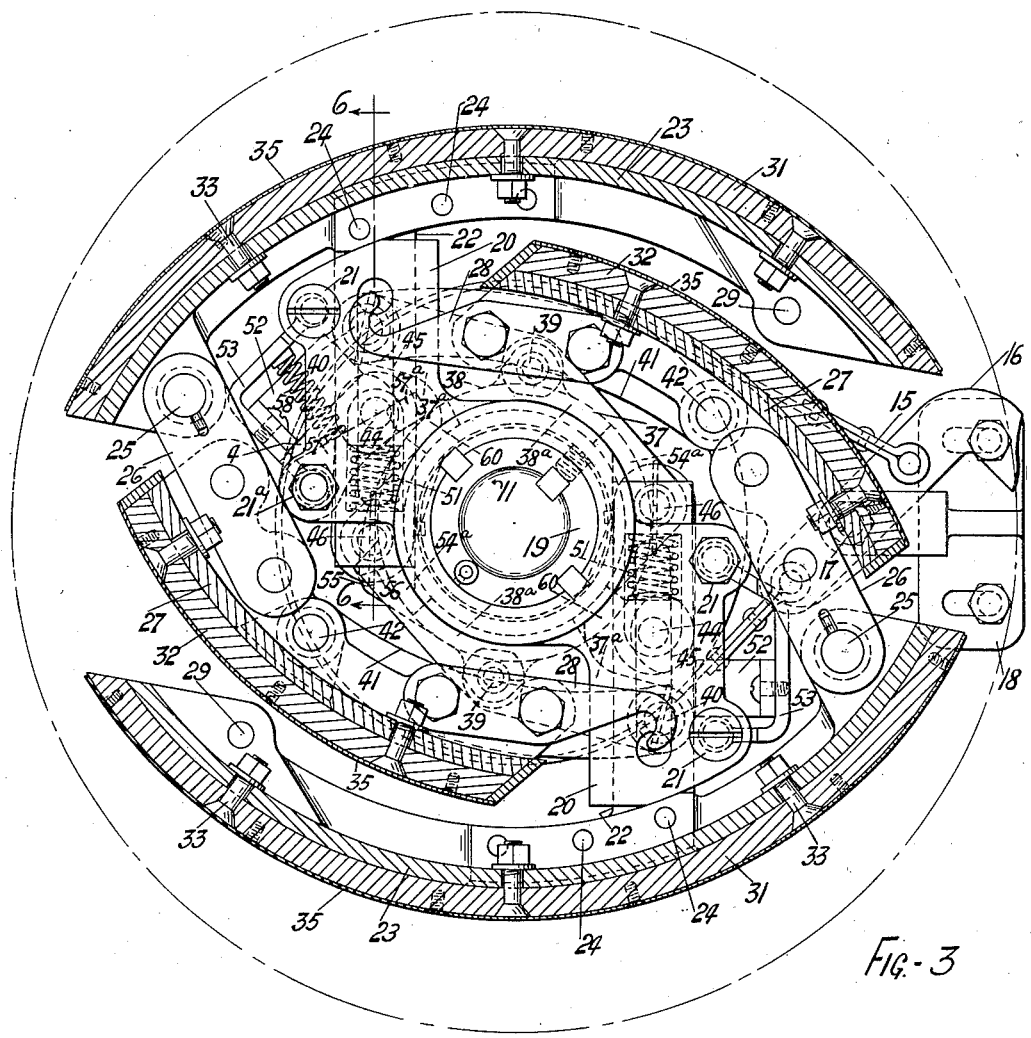
Figure 3 is a section of the drum similar to Figure 1 but in collapsed position.

Continued movement of the wrist plates moves the drum sections 23 radially inward, and the drum sections 27 continue their folding or pivotal movement, the differential speed of movement of the two pairs of drum sections serving to keep the sections 27 clear of the sections 23 as the latter move toward each other. The fully collapsed drum is shown in Figure 3, this condition being attained when the wrist plates 37 make about one-fourth a revolution relative to the spindle 11. When the drum is fully collapsed further relative movement of the respective parts is impossible, and the braking force on the sleeve 12 is transmitted to the spindle 11 with the result that the drum comes to rest. Because every section of the drum moves relatively of every other section thereof during collapsing, a tire built upon the drum will be loosened from the surface thereof at least throughout the major portion of the contacting area of the tire and drum so that little effort or time is required to effect their complete separation, permitting the tire to be removed.

Restoration of the drum to assembled form is effected simply by starting the motor of the tire machine to rotate the spindle 11 in the direction indicated by the arrow A, Figure 1, the centrifugal force of the rotating members being sufficient to throw them outwardly to the positions shown in Figure 1, whereby the wrist plates 37 and yoke 38 are moved angularly of the spindle 11. This movement of the yoke 38 may be visualized with reference to Figure 7 as a clockwise movement of the yoke with relation to the collar 54, whereby the lugs 38ᵃ take up the lost motion between themselves and the lugs 54ᵃ of the collar to drive the latter and the sleeve 12, with the result that the cam 55 moves out from under the dog 57 and permits the spring 58 to swing the free end of the latter behind the tooth 56. With the parts in this condition collapse of the drum is impossible except by the means and in the manner described.

The drum is easily and quickly collapsed and assembled, and accomplishes the other objects set forth in the foregoing statement of objects.

The invention is susceptible of modification within the scope of the appended claims, which are not limited wholly to the specific construction shown and described.

What is claimed is:

1. A collapsible tire building form comprising a pair of oppositely disposed form sections movable in a radial direction, and respective intermediate form sections pivotally connected at one end to each of the latter, the free ends of the intermediate sections being movable about said pivots.

2. A collapsible tire building form comprising a pair of sections movable in a radial direction, respective intermediate sections pivotally mounted at one end on each of the latter, the free ends of the intermediate sections being movable about said pivots, and means for so moving all of the said sections as to effect complete collapse of the form.

3. A collapsible tire building form comprising a pair of oppositely disposed form sections movable in a radial direction, respective form sections pivoted at one end to each of the aforesaid sections, the free ends of said sections being movable about said pivots, and a single axially rotatable member connected to the several sections for collapsing the form.

4. A combination as defined in claim 3 in which the rotary member is so connected to the form sections as to initiate the collapsing of the hinged sections first.

5. A collapsible tire building form comprising a pair of oppositely disposed sections movable in a radial direction, respective sections hinged to each of the aforesaid sections, and an axially rotatable member for collapsing the form, said member having positive connection with the hinged sections and lost motion connection with the radially movable sections.

6. A collapsible tire building form comprising a pair of oppositely disposed sections movable in a radial direction, respective sections hinged to each of the aforesaid sections, and a single rotary member for collapsing the form, said rotary member being so connected to the radially movable sections and the hinged sections as to move the latter faster.

7. In apparatus of the character described, the combination of a rotatable spindle, a collapsible drum carried thereby, a sleeve mounted upon said spindle and movable relatively thereof, drum collapsing means, latch mechanism connecting the drum collapsing means to the sleeve, and means for automatically engaging and disengaging said latch mechanism.

8. A combination as defined in claim 7 in which the latch mechanism is so constructed and arranged as to prevent relative movement of the sleeve and spindle when the latter is rotating in one direction, and to permit relative movement of said members when the spindle is rotating in the opposite direction.

9. In apparatus of the character described, the combination of a rotatable spindle, a segmental tire building form carried thereby, a sleeve mounted upon said spindle and rotatable relatively thereof, means for collapsing the form, a latch carried by the building-form assembly and engaging the form-collapsing means to render the same inoperative, and means associated with the sleeve for raising the latch to operative position.

10. In apparatus of the character described, the combination of a rotatable spindle, a segmental tire-building form carried thereby, a sleeve mounted upon said spindle and having normal limited angular movement relative thereto, means for collapsing the form, a latch carried by the form-assembly and engaging the form-collapsing means to render the same inoperative, and means carried by the sleeve, and operative during the limited angular movement of the latter with relation to the spindle, for lifting the latch out of engagement with the form-collapsing means whereby continued relative angular movement of the sleeve is permitted, for operating the form-collapsing means.

11. A combination as defined in claim 10 including means for causing relative angular movement of the sleeve and spindle.

12. The combination in an annular collapsible tire-building form, of a pair of oppositely disposed sections movable as a whole inwardly of their normal positions in the form circle, and intermediate sections pivoted at one end respectively to each of the first-named sections, the free ends of the last-named sections being movable about their pivots inwardly toward the axis of said form whereby when the form is collapsed all sections in their entirety will be inwardly of their normal positions in the form circle.

13. The combination in an annular collapsible tire-building form, of a pair of oppositely disposed sections movable as a whole inwardly of their normal positions in the form circle, intermediate sections pivoted at one end respectively to each of the first-named sections, the free ends of the last-named sections being movable about their pivots inwardly toward the axis of said form whereby when the form is collapsed all sections in their entirety will be inwardly of their normal positions in the form circle, and means for so moving all of said sections as to effect complete collapse of the form.

14. The combination in an annular collapsible tire-building form, of a pair of oppositely disposed sections movable as a whole inwardly of their normal positions in the form circle, intermediate sections pivoted at one end respectively to each of the first-named sections, the free ends of the last-named sections being movable about their pivots inwardly toward the axis of said form whereby when the form is collapsed all sections in their entirety will be inwardly of their normal positions in the form circle, and a single axially rotatable member connected to the several sections for collapsing the form.

ALLEN L. HESTON.
FLORAIN J. SHOOK.
EARL W. EVANS.